(12) United States Patent
Shin et al.

(10) Patent No.: US 9,242,613 B2
(45) Date of Patent: Jan. 26, 2016

(54) SYSTEM AND METHOD FOR CONTROLLING AIRBAG

(71) Applicant: HYUNDAI MOTOR COMPANY, Seoul (KR)

(72) Inventors: Jeong Heon Shin, Suwon-si (KR); Seung-Chang Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/562,181

(22) Filed: Dec. 5, 2014

(65) Prior Publication Data

US 2015/0321632 A1 Nov. 12, 2015

(30) Foreign Application Priority Data

May 7, 2014 (KR) .................. 10-2014-0054344

(51) Int. Cl.
*B60R 21/013* (2006.01)
*G06K 9/00* (2006.01)
*B60R 21/0134* (2006.01)
*G01C 21/36* (2006.01)
*G01C 21/26* (2006.01)

(52) U.S. Cl.
CPC ........... *B60R 21/013* (2013.01); *B60R 21/0134* (2013.01); *G01C 21/26* (2013.01); *G01C 21/3697* (2013.01); *G06K 9/00805* (2013.01); *Y02T 10/84* (2013.01)

(58) Field of Classification Search
CPC ............. B60R 21/013; B60R 21/0134; G06K 9/00805; G01C 21/3697; G01C 21/26; Y02T 10/84

See application file for complete search history.

(56) References Cited

U.S. PATENT DOCUMENTS

| | | | |
|---|---|---|---|
| 2005/0033516 A1* | 2/2005 | Kawasaki | B60R 21/013 701/301 |
| 2008/0161989 A1* | 7/2008 | Breed | B60J 10/00 701/31.4 |
| 2013/0124052 A1* | 5/2013 | Hahne | B60R 21/0134 701/46 |
| 2014/0330485 A1* | 11/2014 | Feser | B60R 21/013 701/45 |
| 2015/0232091 A1* | 8/2015 | Lich | B60W 30/09 701/41 |

FOREIGN PATENT DOCUMENTS

| | | |
|---|---|---|
| JP | 2006-525913 A | 11/2006 |
| KR | 10-0187105 B1 | 12/1998 |
| KR | 10-2005-0034866 A | 4/2005 |
| KR | 10-0500270 B1 | 7/2005 |

* cited by examiner

*Primary Examiner* — Faye M Fleming
(74) *Attorney, Agent, or Firm* — McDermott Will & Emery LLP

(57) ABSTRACT

A system for controlling an airbag may include: an accident information collector configured to collect accident information and divide an entire road into a plurality of sections; an accident information analyzer configured to generate statistical information for each section by analyzing the accident information; a threshold value calculator configured to calculate a threshold value for each section, wherein the threshold value is a reference for inflating the airbag; and a inflation controller configured to determine whether to inflate the airbag based on the threshold value for each section.

8 Claims, 4 Drawing Sheets

SYSTEM AND METHOD FOR CONTROLLING AIRBAG

CROSS-REFERENCE TO RELATED APPLICATION

This application claims priority to and the benefit of Korean Patent Application No. 10-2014-0054344 filed in the Korean Intellectual Property Office on May 7, 2014, the entire contents of which are incorporated herein by reference.

FIELD OF THE INVENTION

The present disclosure relates to a system and a method for controlling an airbag.

BACKGROUND

An airbag and a seat belt are safety apparatuses that protect drivers or passengers from impact when an accident occurs.

The airbag is installed at the front or side of a driver's seat. When a signal from a front collision sensor or a side collision sensor is received, is determined whether or not to inflate the airbag according to impact amount of the collision. The airbag is inflated if the impact amount satisfies a threshold value. The threshold value is preset when manufacturing the airbag.

Since the threshold value is preset as a fixed value, the airbag may not be appropriately inflated. In other words, the airbag may be inflated with insignificant impact and thus a secondary accident such as injury of driver or repair cost occurs.

The above information disclosed in this Background section is only for enhancement of understanding of the background of the invention and therefore it may contain information that does not form the prior art that is already known in this country to a person of ordinary skill in the art.

SUMMARY

The present inventive concept has been made in an effort to provide a system and a method for controlling an airbag having advantages of changing a threshold value for inflating the airbag according to a vehicle position.

A system for controlling an airbag according to an exemplary embodiment of the present invention may include: an accident information collector configured to collect accident information and divide an entire road into a plurality of sections; an accident information analyzer configured to generate statistical information for each section by analyzing the accident information; a threshold value calculator configured to calculate a threshold value for each section, wherein the threshold value is a reference for inflating the airbag; and a inflation controller configured to determine whether to inflate the airbag based on the threshold value for each section.

The accident information collector, the accident information analyzer and the threshold value calculator may be included in a remote server and the inflation controller may be included in a vehicle terminal.

When the vehicle terminal enters a section where many accidents occur, the remote server may transmit the threshold value corresponding to the section where many accidents occur to the vehicle terminal.

The accident information collector and the accident information analyzer may be included in a remote server and the threshold value calculator and the inflation controller may be included in a vehicle terminal.

The accident information may include at least one of information on a vehicle identifier, time when an accident occurs, weather, location where the accident occurs, the type of the vehicle, the type of the accident, a vehicle speed immediately before the accident occurs, whether airbag is inflated.

The statistical information for each section may include at least one of information on the type of accident and accident occurrence frequency.

A method for controlling an airbag according to an exemplary embodiment of the present invention may include: collecting, by a remote server, accident information; dividing, by the remote server, an entire road into a plurality of sections; generating, by the remote server, statistical information for each section by analyzing the accident information; calculating, by the remote server, a threshold value for each section based on the statistical information for each section, wherein the threshold value is a reference for inflating the airbag; and transmitting, by the remote server, the threshold value for each section to a vehicle terminal.

When the vehicle terminal enters a section where many accidents occur, the transmitting the threshold value for each section to a vehicle terminal may include transmitting by the remote server, the threshold value corresponding to the section where many accidents occur.

According to the exemplary of the present invention, the threshold value for each section may be calculated based on the accident information and the statistical information, and the inflation of the airbag can be controlled when the vehicle enters the section where many accidents occur. Therefore, the driver airbag, the passenger airbag, and the side airbag may be separately controlled based on the threshold value for each section, and thereby it is possible to improve safety of the driver and passenger.

DETAILED DESCRIPTION OF THE EMBODIMENTS

Hereinafter, the present inventive concept will be described more fully with reference to the accompanying drawings, in which exemplary embodiments of the invention are shown.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Figure 1:
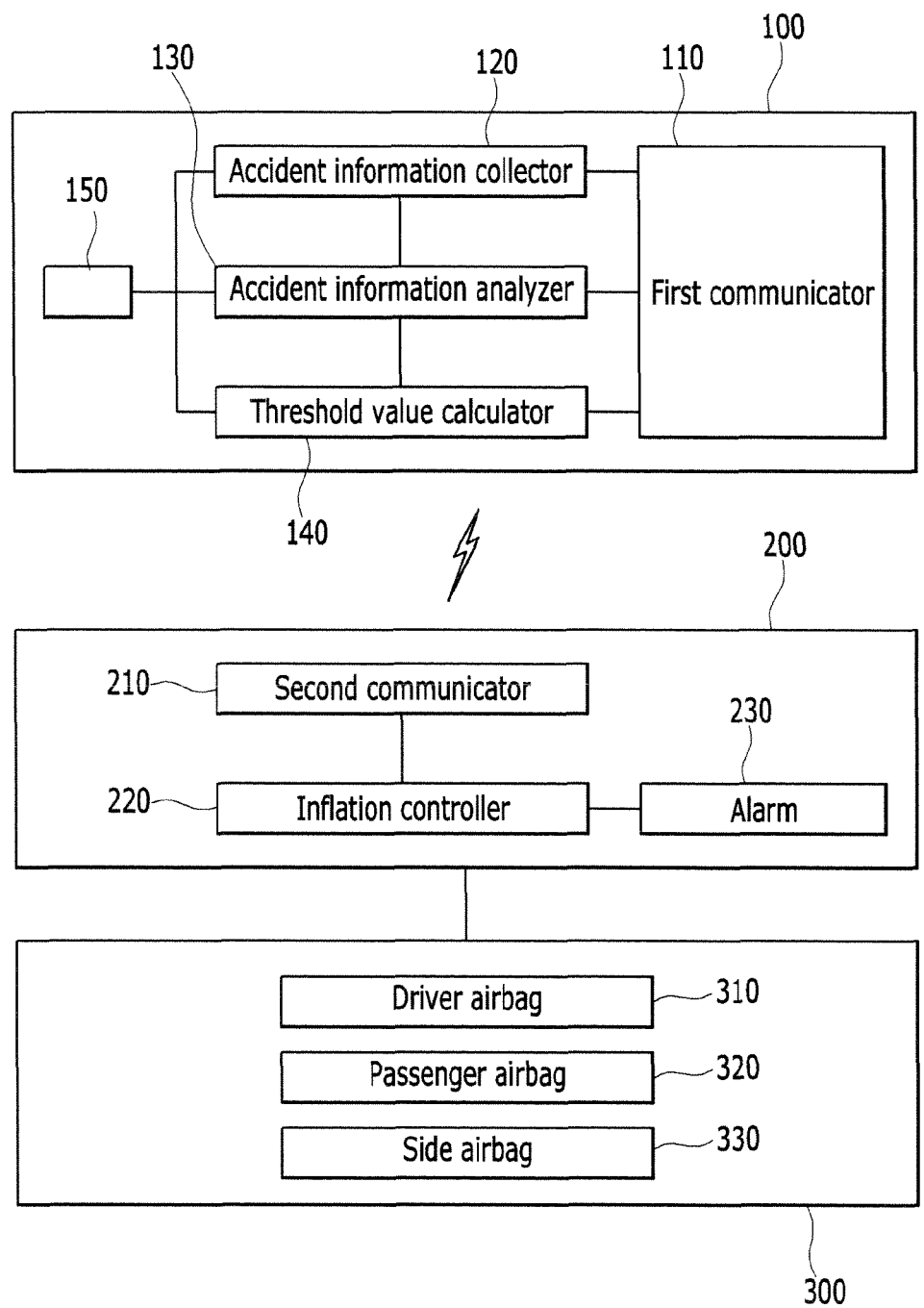
FIG. 1 is a block diagram of a system for controlling an airbag according to an exemplary embodiment of the present invention.

FIG. 1 is a block diagram of a system for controlling an airbag according to an exemplary embodiment of the present invention.

As shown in FIG. 1, a system for controlling an airbag according to an exemplary embodiment of the present invention may include a remote server 100 and a vehicle terminal 200. The remote server 100 may be provided in a telematics center and the vehicle terminal 200 may be provided in a vehicle. The remote server 100 and the vehicle terminal 200 are connected each other through a wired or wireless network.

The remote server 100 collects accident information from an accident vehicle and calculates a threshold value for each section. The threshold value is a reference value for inflating airbag 300.

The remote server 100 may include a first communicator 110, an accident information collector 120, an accident information analyzer 130, a threshold value calculator 140, and a storage 150.

The remote server 100 receives the accident information from the accident vehicle through the first communicator 110 and transmits the threshold value calculated by the threshold value calculator 140 to the vehicle terminal 200.

The first communicator 110 is configured to transmit or receive information with at least one of a base station, an external terminal, and a server through a wired or a wireless network. In detail, the first communicator 110 may receive the accident information from the accident vehicle, other vehicles located within a predetermined distance from the accident vehicle, a closed circuit television (CCTV), a traffic information center, and the like.

The accident information collector 120 collects the accident information through the first communicator 110. The accident information may include information on a vehicle identifier, the time when the accident occurs, weather, the location where the accident occurs, the type of the vehicle, the type of the accident, a vehicle speed immediately before the accident occurs, whether the airbag is inflated, and the like. In addition, the accident information collector 120 may divide an entire road into a plurality of sections.

Figure 2:
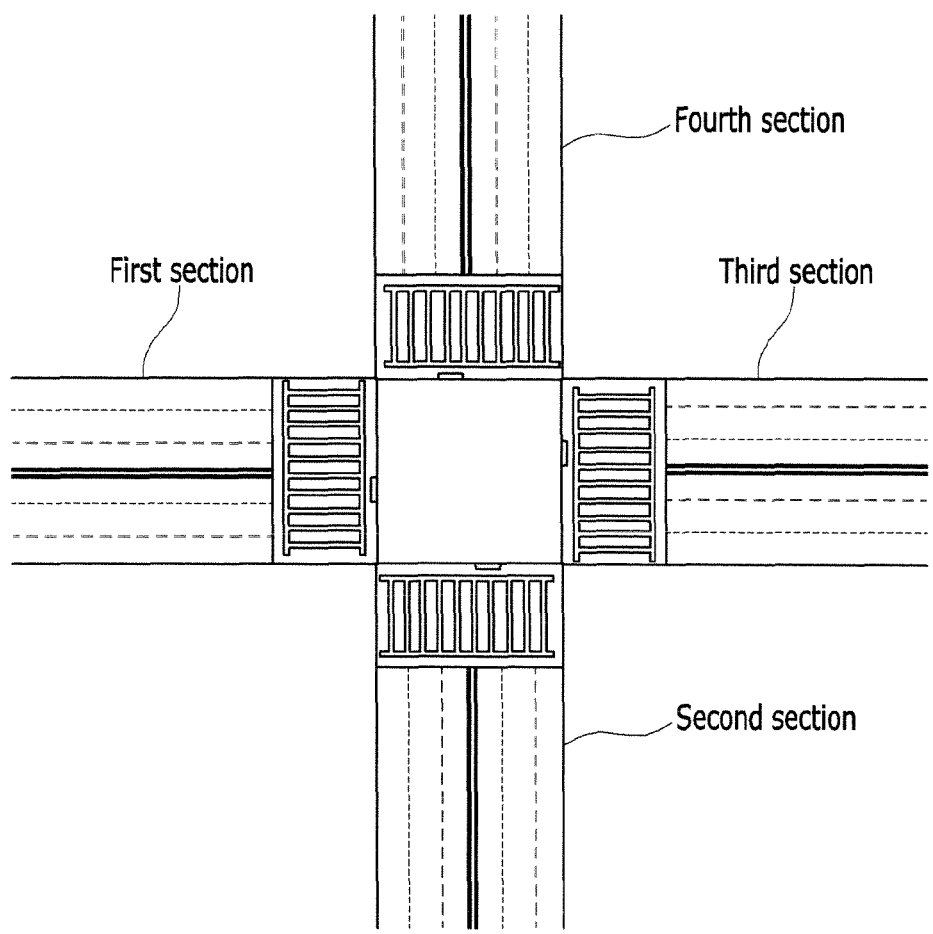
FIG. 2 is a drawing illustrating a plurality of sections according to an exemplary embodiment of the present invention.

FIG. 2 is a drawing illustrating a plurality of sections according to an exemplary embodiment of the present invention.

As shown in FIG. 2, the plurality of sections may include a first section, a second section, a third section, and a fourth section. For example, accident information corresponding to the sections shown in FIG. 2 is shown in Table 1.

TABLE 1

| Vehicle identifier | Time when accident occurs | Weather | Location where accident occurs | Type of vehicle | Type of accident | Vehicle speed (km/h) | ... |
|---|---|---|---|---|---|---|---|
| First vehicle | February 10/morning | Rain | First section | Sedan | Front Collision | 40 | ... |
| Second vehicle | February 11/morning | Snow | Second section | Sedan | Left side collision | 50 | ... |
| Third vehicle | March 03/afternoon | Sunny | Second section | Sedan | Left side collision | 50 | ... |
| ... | ... | ... | ... | ... | ... | ... | |

The accident information analyzer 130 generates statistical information for each section by analyzing the accident information when the accident information collector 120 collects the accident information. The statistical information for each section may include information on the type of accident, accident occurrence frequency, and the like. In addition, the accident information analyzer 130 may generate an alarm message for indicating an accident risk based on the statistical information.

For example, statistical information for each section generated by the accident information analyzer 130 is shown in Table 2.

TABLE 2

| Location where accident occurs | Type of accident | | Accident occurrence frequency | ... |
|---|---|---|---|---|
| First section | Vehicle - vehicle | Front collision | Twenty times/year | ... |
| First section | Vehicle - vehicle | Left side collision | Eighty times/year | ... |
| First section | Vehicle - vehicle | Right side collision | Thirteen times/year | ... |
| ... | ... | ... | ... | |
| First section | Vehicle - person | Front collision | Forty one times/year | ... |
| Second section | Vehicle - vehicle | Left side collision | Eight times/year | ... |
| ... | | ... | Left side collision | |

Table 2 shows that left side collisions between vehicles most frequently occurs in the first section.

The threshold value calculator 140 calculates the threshold value for each section when the accident information analyzer 130 generates the statistical information for each section.

In detail, the threshold value calculator 140 may calculate the threshold value for each section based on the type of accident and accident occurrence frequency for each section.

For example, since the left side collisions between vehicles most frequently occurs in the first section, the threshold value calculator 140 calculates the threshold value corresponding to the first section in preparation for the left side collision between vehicles. That is, the threshold value calculator 140 calculates the threshold value which is a reference for inflating a side airbag. Since the left side collisions between vehicles occurs in the second section less than in the first section, the threshold value corresponding to the second section is lower than the threshold value corresponding to the first section. That is, the side airbag is easily inflated in the first section.

The threshold value for each section is transmitted to the vehicle terminal 200 through the first communicator 110. For example, the threshold value calculator 140 may transmit the threshold value for each section to the vehicle terminal 200 when the vehicle enters the first section.

The accident information, the statistical information and the threshold value for each section are stored in the storage 150.

The vehicle terminal 200 controls inflating of the airbag 300 based on the threshold value for each section. The vehicle terminal 200 may include a second communicator 210, an inflation controller 220, and an alarm 230.

The second communicator 210 is configured to transmit and receive information with the remote server 100 through the wired or the wireless network. That is, the second communicator 210 performs communication with the first communicator 110 and receives the threshold value for each section and the alarm message indicating an accident risk.

The inflation controller 220 determines whether to inflate the airbag 300 based on the threshold value for each section.

The airbag 300 may include a driver airbag 310, a passenger air bag 320, and a side airbag 330.

The inflation controller 220 may separately control the driver airbag 310, the passenger airbag 320, and the side airbag 330 based on the threshold value for each section.

The alarm 230 may provide the warning message, which is transmitted from the remote server 100, to the driver.

Figure 3:
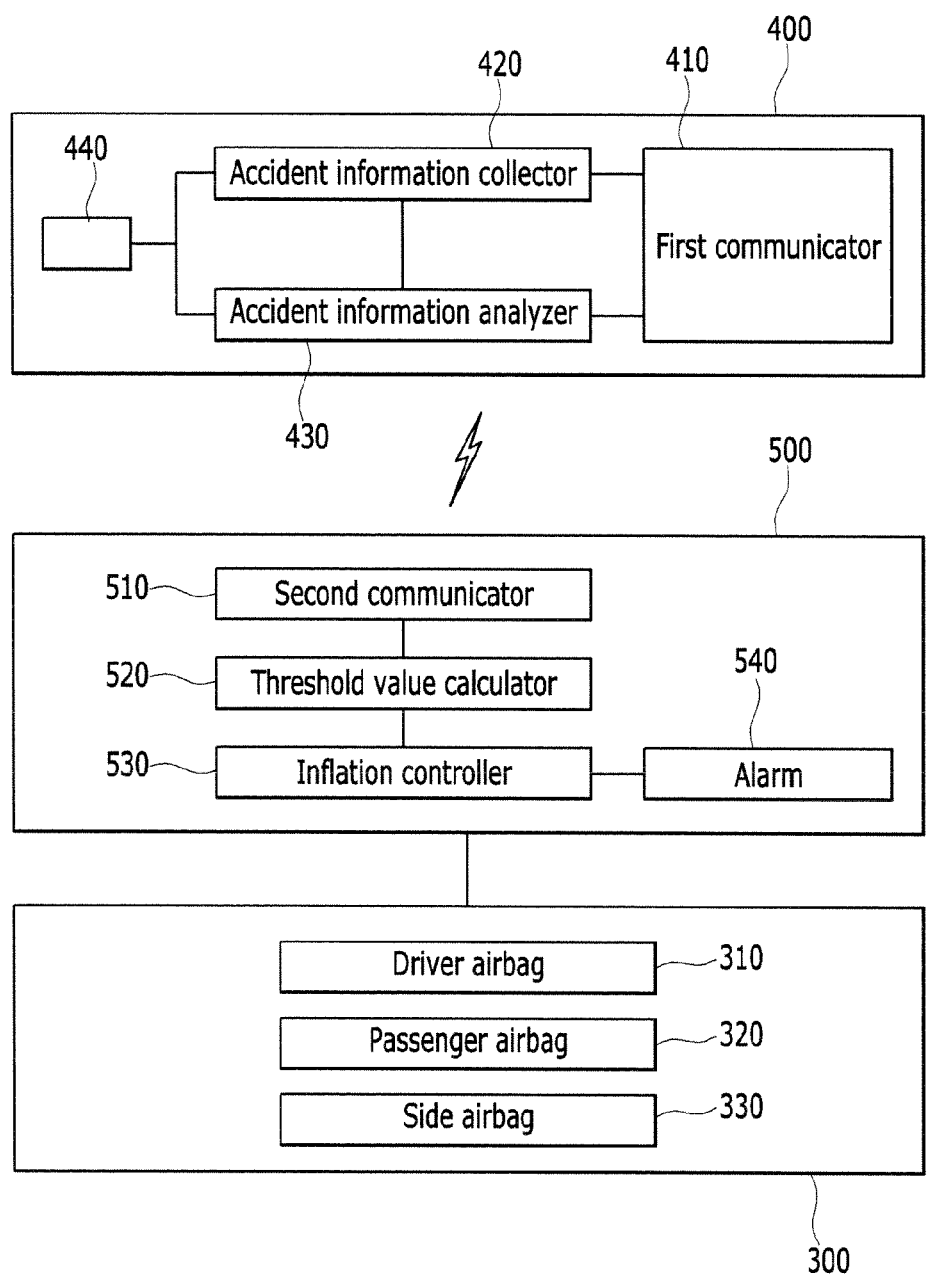
FIG. 3 is a block diagram of a system for controlling an airbag according to another exemplary embodiment of the present invention.

FIG. 3 is a block diagram of a system for controlling an airbag according to another exemplary embodiment of the present invention.

As shown in FIG. 3, a system for controlling an airbag according to another exemplary embodiment of the present invention may include a remote server 400 and a vehicle terminal 500. The remote server 400 may include a first communicator 410, an accident information collector 420, an accident information analyzer 430, and a storage 440. The vehicle terminal 500 may include a second communicator 510, a threshold value calculator 520, and an inflation controller 530.

The accident information analyzer 430 generates statistical information for each section by analyzing accident information when the accident information collector 420 collects the accident information.

The statistical information for each section is transmitted to the vehicle terminal 500 through the first communicator 410.

The threshold value calculator 520 may calculate the threshold value for each section based on the type of accident and accident occurrence frequency for each section.

The inflation controller 530 determines whether to inflate the airbag 300 based on the threshold value for each section.

Since the system for controlling the airbag according to the current embodiment of the present invention is similar to the system for controlling the airbag according to the previous exemplary embodiment of the present invention, except for the threshold value calculator 520 is included in the vehicle terminal 500, a detailed description will be omitted.

Figure 4:
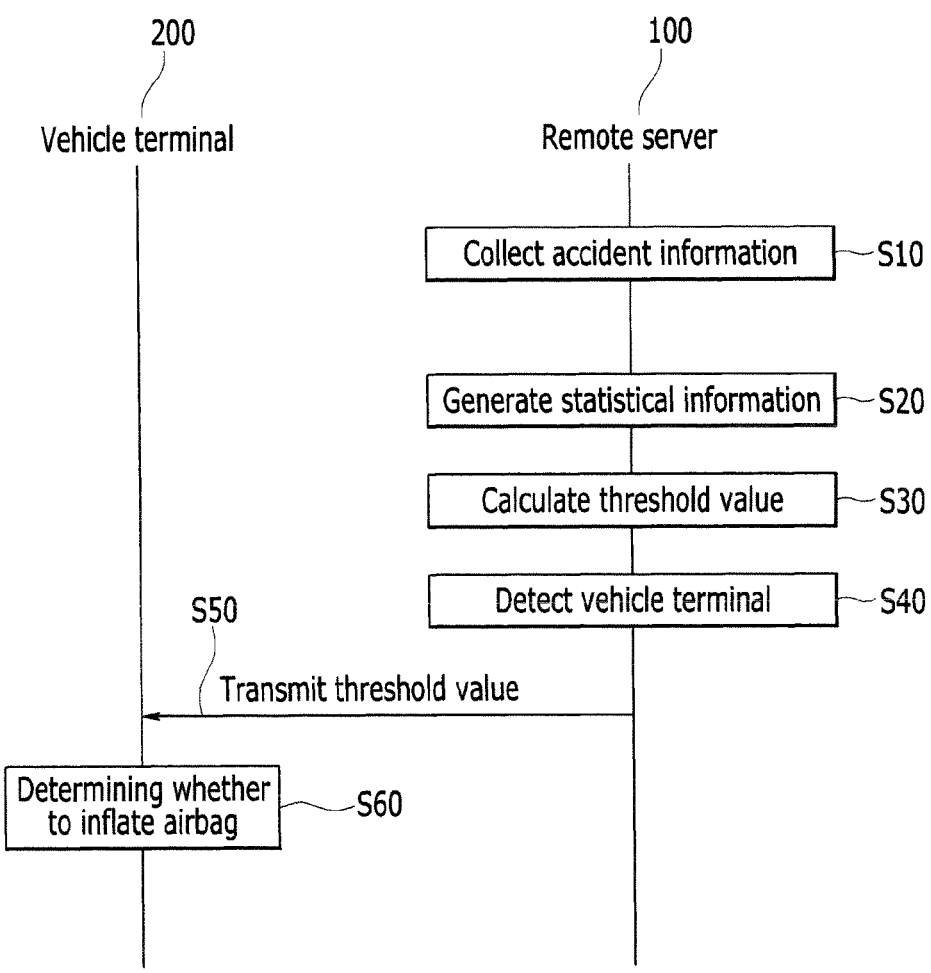
FIG. 4 is a flow chart of a method for controlling an airbag according to an exemplary embodiment of the present invention.

FIG. 4 is a flow chart of a method for controlling an airbag according to an exemplary embodiment of the present invention.

Hereinafter, description will be made based on the system for controlling the airbag shown in FIG. 1.

The remote server 100 collects accident information at step S10. The accident information may include information on a vehicle identifier, the time when the accident occurs, weather, the location where the accident occurs, the type of the vehicle, the type of the accident, a vehicle speed immediately before the accident occurs, whether airbag is inflated, and the like. In addition, the remote server 100 may divide the entire road into the plurality sections.

The remote server 100 generates statistical information for each section by analyzing the accident information at step S20. The statistical information for each section may include information on the type of accident, accident occurrence frequency, and the like.

The remote server 100 calculates the threshold value for each section based on the statistical information for each section at step S30. The remote server 100 may calculate the threshold value for each section based on the type of accident and accident occurrence frequency for each section.

When the remote server 100 detects the vehicle terminal 200 entering a section where many accidents occur at step S40, the remote server 100 transmits the threshold value corresponding to the section where many accidents occur to the vehicle terminal 200 at step S50. In this case, the remote server 100 may transmit the alarm message indicating an accident risk of the section to the vehicle terminal 200.

The vehicle terminal 200 determines whether to inflate the airbag 300 based on the threshold value corresponding to the section where many accidents occur at step S60.

As described above, according to the exemplary of the present invention, the threshold value for each section may be calculated based on the accident information and the statistical information, and the inflation of the airbag can be controlled when the vehicle enters the section where many accidents occur. Therefore, the driver airbag, the passenger airbag, and the side airbag may be separately controlled based on the threshold value for each section, and thereby it is possible to improve safety of the driver and passenger.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling an airbag, comprising:
   an accident information collector configured to collect accident information and divide an entire road into a plurality of sections;
   an accident information analyzer configured to generate statistical information for each section by analyzing the accident information;
   a threshold value calculator configured to calculate a threshold value for each section, wherein the threshold value is a reference value for deciding to inflate the airbag; and
   an inflation controller configured to determine whether to inflate the airbag based on the threshold value for each section.

2. The system of claim 1, wherein the accident information collector, the accident information analyzer and the threshold value calculator are included in a remote server and the inflation controller is included in a vehicle terminal.

3. The system of claim 2, wherein when the vehicle terminal enters a section where many accidents occur, the remote server transmits the threshold value corresponding to the section where many accidents occur to the vehicle terminal.

4. The system of claim 1, wherein the accident information collector and the accident information analyzer are included in a remote server, and the threshold value calculator and the inflation controller are included in a vehicle terminal.

5. The system of claim 1, wherein the accident information includes at least one of information on a vehicle identifier, the time when an accident occurs, weather, the location where the accident occurs, the type of the vehicle, the type of the accident, a vehicle speed immediately before the accident occurs, whether airbag is inflated.

6. The system of claim 5, wherein the statistical information for each section includes at least one of information on the type of accident and accident occurrence frequency.

7. A method for controlling an airbag, comprising:
   collecting, by a remote server, accident information;

dividing, by the remote server, an entire road into a plurality of sections;
generating, by the remote server, statistical information for each section by analyzing the accident information;
calculating, by the remote server, a threshold value for each section based on the statistical information for each section, wherein the threshold value is a reference value for deciding to inflate the airbag; and
transmitting, by the remote server, the threshold value for each section to a vehicle terminal.

8. The method of claim 6, wherein when the vehicle terminal enters a section where many accidents occur, the step of transmitting the threshold value for each section to a vehicle terminal includes transmitting by the remote server, the threshold value corresponding to the section where many accidents occur.

* * * * *